Nov. 9, 1948.  S. GUARNASCHELLI  2,453,127
PIPE COUPLING
Filed Nov. 16, 1945
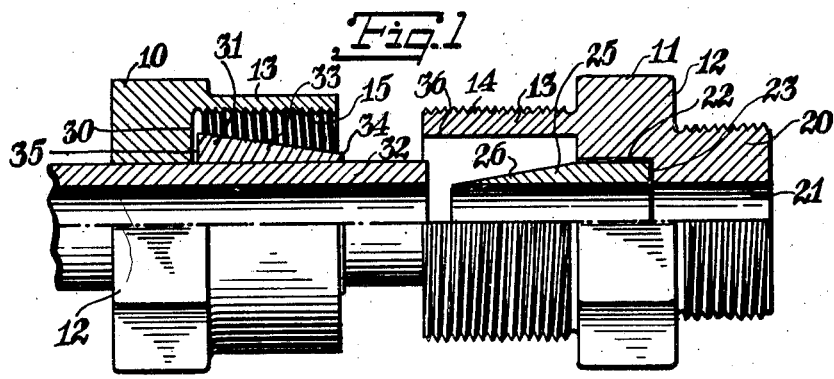
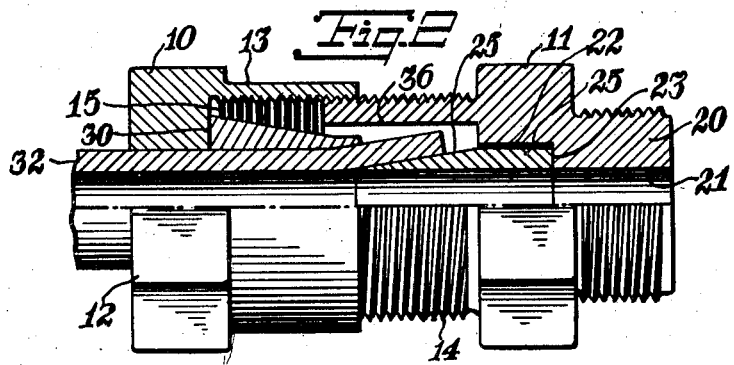
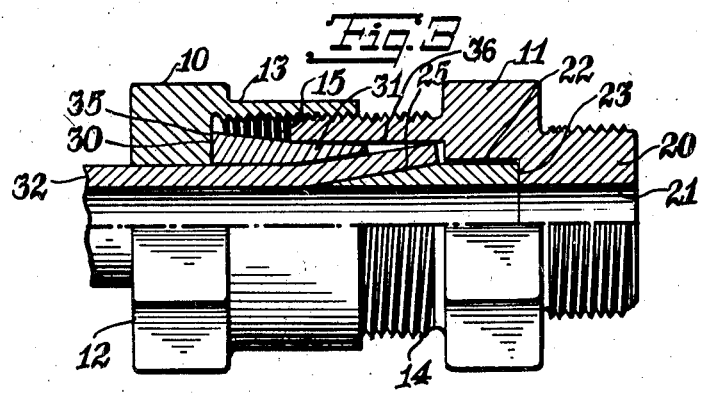
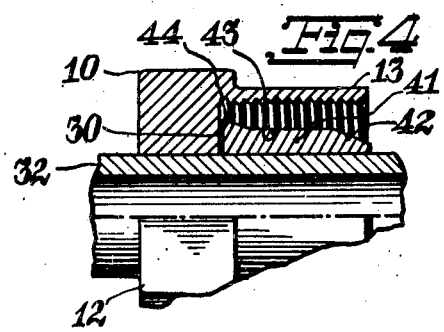
INVENTOR.
Stephen Guarnaschelli
BY
Luther W Hawley ATTY.

Patented Nov. 9, 1948

2,453,127

UNITED STATES PATENT OFFICE 2,453,127

PIPE COUPLING

Stephen Guarnaschelli, New Rochelle, N. Y., assignor to Packless Metal Products Corporation, New Rochelle, N. Y., a corporation of New York Application November 16, 1945, Serial No. 629,003

4 Claims. (Cl. 285—86)

This invention relates to pipe couplings and more particularly to a coupling adapted for attachment to a pipe of deformable or ductile material.

The invention has for its object to provide a coupling of the character described so constructed and arranged that it can be easily and quickly connected to the end of a pipe and will form a tight seal between said end and the coupling.

Further objects of the invention will appear from the following specification taken in connection with the drawings which form a part of this application, and in which Fig. 1 is an elevational view, one-half of which is shown in section illustrating the pipe coupling and pipe prior to the attachment of the coupling to the pipe;

Fig. 2 is a view similar to Fig. 1 showing the coupling members in a position taken as they are being connected to each other and to the pipe;

Fig. 3 is a view similar to Figs. 1 and 2 but illustrating the coupling members secured to each other and to the end of the pipe; and Fig. 4 is a sectional elevation of one of the coupling members illustrating a slightly modified form of construction.

In the particular embodiment of the invention illustrated in the drawings, the coupling comprises a pair of coupling members 10 and 11, each member having a nut-shaped portion 12 and a tubular portion or sleeve 13 projecting therefrom.

The coupling member 11 has external threads 14 on its tubular portion or sleeve 13 and the corresponding sleeve of the coupling member 10 is internally threaded, as shown at 15, the threads on the portions 13 of the two coupling members being complementary and these members being so dimensioned that the sleeve 13 of the coupling member 11 can be threaded in the sleeve of the coupling member 10.

The coupling member 11 has an oppositely extending threaded portion 20 which can be used to secure the coupling to any desired part.

The coupling member 11 has a central bore 21 therethrough, this bore being enlarged to form a recess 22 at the inner end of which is formed a shoulder 23. A wedge-shaped collar or ring 25 is positioned in the recess 22, the rear end of the collar being adapted to abut against the shoulder 23. The internal diameter of the collar is preferably approximately the same as the internal diameter of the bore 21. The outer end of the ring or collar 25 is thinner than the remaining portion thereof and the outer surface 26 of the collar is tapered upwardly and rearwardly. The collar 25 is preferably formed of relatively hard metal or material.

The coupling member 10 has an internal shoulder 30 at the inner end of the sleeve or tube 13 and within this sleeve or tube is positioned a ring or collar 31 preferably formed of deformable material. Attention is called to the fact that the inner surface of the collar is cylindrical and is adapted to receive the end of the pipe 32 to be secured in the coupling. The outer surface 33 of the collar is preferably tapered upwardly from the end 34 to the end 35 thereof.

Attention is called to the fact that the internal diameter of the collar 31 is greater than the external diameter of the outer tapered surface 26 of the collar 25, so that the end of the pipe 32 can be coupled between the surface 26 of the collar 25 and the inner surface of the collar 31. Furthermore, the external diameter of the left hand end of the collar 25, viewing Figs. 1, 2 and 3, is approximately the same as or smaller than the internal diameter of the pipe 32, so that this end of the collar 25 will enter the end of the pipe 32.

When the pipe 32 has been placed in the coupling member 10 in the manner shown in Fig. 1 and the coupling member 11 is moved toward the coupling member 10, the outer end of the coupling member 11 can be tapped with a hammer or other tool until the threads 14 engage the threads 15, thus causing the inner end of the collar 25 to enter the end of the pipe. If desired, the collar itself can be tapped with a tool into the end of the pipe before coupling member 11 is placed thereover. After the threads 14 on the sleeve 13 of the coupling member 11 have entered the threads 15 of the corresponding sleeve of the coupling member 10 and the coupling member 11 is threaded into the coupling member 10, the collar 25 will be forced into the pipe 32 in the manner shown in Fig. 2, flaring the end of the pipe outwardly and also gradually deforming or bending the collar 31. When the coupling member 11 has been tightly connected to the coupling member 10, as shown in Fig. 3, the end of the pipe will be tightly clamped between the outer surface 26 of the coupling member 25 and the inner surface of the coupling member 31. Furthermore, the inner surface 36 of the sleeve 13 carried by the coupling member 11 will tightly engage the outer surface of the collar 31, as shown in Fig. 3. Thus a double seal is formed.

Fig. 4 illustrates a slight modification of the shape of the outer surface of the collar 41 which corresponds to the collar 31 shown in Figs. 1 to 3 inclusive. In this construction, instead of tapering the outer surface of the collar throughout the length thereof, the inner end is tapered steeply, as shown at 42, the intermediate portion 43 is approximately cylindrical, and the remaining portion 44 is again tapered.

Although certain specific embodiments of the invention have been particularly illustrated and described, it will be understood that the invention is capable of modification and that changes in the construction and in the arrangement of the various cooperating parts may be made without departing from the spirit or scope of the invention, as expressed in the following claims.

What I claim is:

1. A pipe coupling comprising a pair of coupling members, means for connecting said members and for drawing them toward each other, and oppositely facing wedge-shaped collars carried by said members, one collar having a smaller outside diameter than the inside diameter of the other collar so that the smaller collar can enter the end of a pipe disposed within the larger collar, said larger collar being formed of deformable material and said smaller collar being formed of relatively hard material, the member having the smaller collar having a portion extending beyond and encircling said collar for engagement with the outer surface of said other collar when said collars are moved into engagement with said pipe.

2. A pipe coupling comprising a pair of coupling members, means for connecting said members and for drawing them toward each other, said members, when arranged in coupling relation, having oppositely facing shoulders, one member having a collar housed therein with an end abutting its shoulder and having an outer surface tapering toward the other end, the other coupling member having a collar housed therein with an end abutting its shoulder and tapered from its end remote from the shoulder to said abutting end, said last named collar being formed of ductile material and having a substantially cylindrical inner surface.

3. A pipe coupling comprising a pair of coupling members, one member having a threaded sleeve adapted to enter a threaded sleeve on the other member, a collar having a cylindrical inner surface carried by each member within the sleeve thereof, said collars being thinner at their inner edges than at their outer or remote edges, the outside diameter of one collar being less than the inside diameter of the other collar, the larger collar being formed of deformable material and the smaller collar adapted to enter into and flare the adjacent end of the pipe to be coupled.

4. A pipe coupling fixture for flaring and coupling the end of a pipe, comprising a pair of coupling members, one member having a threaded sleeve adapted to enter a threaded sleeve on the other member, each member having a wedge shaped sleeve disposed within and spaced within its threaded portion, each of said wedge shaped sleeves having a substantially cylindrical inner surface and a tapered outer surface, the tapered sleeves being thinner at their inner edges, and the outside diameter of one of the wedge shaped sleeves being less than the inside diameter of the other wedge shaped sleeve and adapted to enter the bore of the pipe and flare the pipe and deform the tapered end of the larger wedge-shaped sleeve into sealing engagement with the threaded sleeve housing the smaller wedge-shaped sleeve.

STEPHEN GUARNASCHELLI.

REFERENCES CITED

The following references are of record in the file of this patent:

FOREIGN PATENTS

| Number | Country | Date |
|---|---|---|
| 403,870 | Great Britain | Jan. 4, 1934 |
| 546,306 | Great Britain | July 7, 1942 |